Patented June 6, 1950

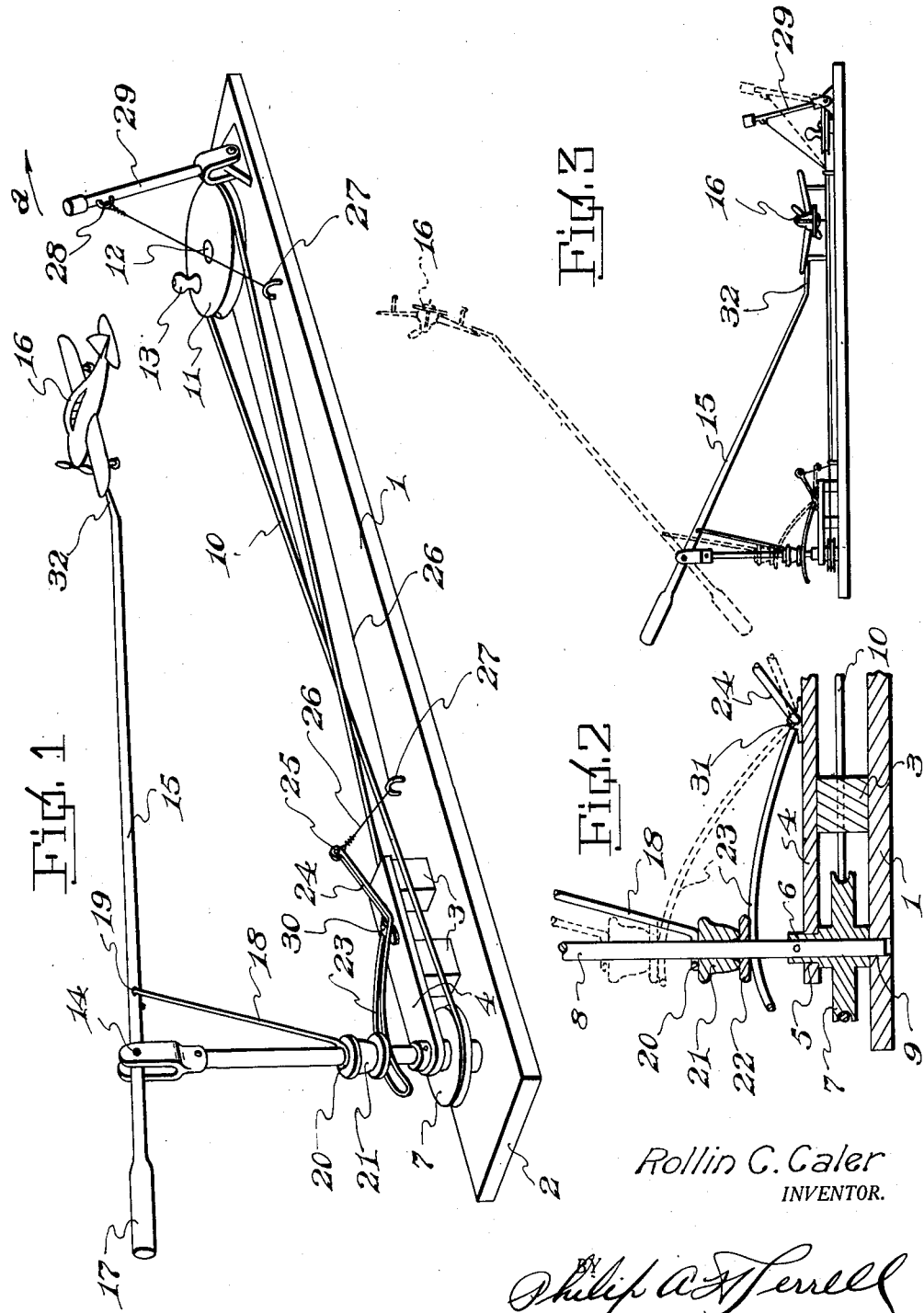

2,510,169

UNITED STATES PATENT OFFICE 2,510,169

AIRPLANE TOY

Rollin C. Caler, Tulsa, Okla.

Application February 13, 1947, Serial No. 728,277

1 Claim. (Cl. 272—31)

The invention relates to airplane toys of the captive type, and has for its object to mount the airplane on a partially counterbalanced boom, vertically rockable on a rotatable shaft, and means for rotating the shaft.

A further object is to provide an elevating and depressing control means for the boom, and comprising an elevating link pivoted to the boom and having a loop surrounding the shaft above a slidable spool on the shaft and a rockable bell crank lever, rockable on a base and having a loop under the spool around the shaft, and terminating at its rear end in a control cable connected to a control stick at the rear end of the base, adjacent a rotatable member for rotating the vertical shaft.

A further object is to partially counterweight the boom whereby the airplane carried by the boom will gravitate towards the base when the control stick is released.

A further object is to rockably mount the bell crank lever above the forward drive pulley and on the vertical longitudinal center of the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the toy.

Figure 2 is a vertical longitudinal sectional view through a portion of the forward end of the toy.

Figure 3 is a side elevation of the toy showing an extreme elevated position in dotted lines.

Referring to the drawing, the numeral 1 designates an elongated base adapted to rest on a table or other support. Secured to the base adjacent its forward end 2 are upwardly extending blocks 3, to which is secured a horizontal member 4, the forward end of which forms a bearing 5 for the upper hub 6 of the forward driven pulley 7, which has secured therein the vertical driven shaft 8.

The lower end of the shaft has a bearing at 9 in the base 1.

Driven pulley 7 is driven by means of a crossed belt 10, which belt extends rearwardly and around a drive pulley 11 at the rear end of the base, and which drive pulley is pivoted at 12, and provided with a handle member 13 adapted to be grasped by the operator for rotating the pulley 11, consequently imparting rotation to the vertical shaft 8.

Shaft 8 extends upwardly and has pivoted, at 14, in the bifurcation thereof, the boom 15. The long end of the boom terminates in an airplane 16, adapted to be rotated in a circle, and elevated and depressed for simulating the actions of an airplane, for instance, as shown in dotted lines in Figure 3, a banking operation. Boom 15 is partially counterweighted by a counterweight 17 to relieve the downward thrust on the elevator arm 18, which arm is pivoted at 19 to the boom, and terminates at its lower end in an eye 20, loosely surrounding the shaft 8 and resting on the spool 21 on the shaft.

Spool 21 slides upwardly and downwardly on shaft 8 and does not rotate therewith. Also mounted on shaft 8 and slidable thereon, in engagement with the under side of the spool 21, is a washer 22, which washer rests on the forwardly extending bell crank looped arm 23, through which loop the vertical shaft 8 extends. The bell crank is designated by the numeral 24.

Looped arm 23 curves forwardly, upwardly and downwardly, as shown in Figure 2 to form a curved surface for engaging the under side of the washer 22 during the raising and lowering operation. By providing a looped arm of this type the washer will not rotate, and at the same time, the curvature will insure the engagement of the arm substantially on the transverse center of the washer as it is moved to various elevations.

The rear end of the bell crank arm has connected thereto, at 25, a control cable 26, which extends through eyes 27 carried by the base and is connected at 28 to the upper end of a control lever 29. It will be seen that when the lever 29 is moved in the direction of the arrow $a$ the airplane 16 will be raised, and when the lever is moved in the opposite direction, the weight of the partially counterweighted boom 15 and airplane 16 will lower the airplane and boom by gravity against the action of the counterweight 17. One of the spaced arms of the curved arm 23 is provided with a transverse portion 30, rockably mounted in a bracket 31 carried by the member 4, therefore it will be seen that the bell crank lever can be formed from substantially a single piece of material, and the bell crank lever can be placed on the vertical longitudinal center of the device.

From the above it will be seen that a captive airplane toy is provided, which is simple in construction, and one wherein the airplane can be elevated or depressed for simulating the movement of an airplane. It will also be seen that the airplane 16 is mounted on an angular portion 32 of the boom 15 so that when the control stick is released, the airplane will rest on the table or support in a horizontal position, and will come to this lowered position by gravity against the action of the counterweight 17.

The invention having been set forth what is claimed as new and useful is:

A captive airplane toy comprising a vertical rotating shaft, a partially counterweighted boom rockably carried by said shaft, means for rotating the vertical shaft, means for rocking the boom, said means comprising a bell crank lever pivotally mounted on the longitudinal center of the toy, a slidable member mounted on the rotating shaft, an elevating arm pivoted to the boom, the lower end of the elevating arm having an eye through which the shaft moves and in the path of the vertical slidable member, one arm of the bell crank lever being longitudinally curved upwardly, forwardly and downwardly in elongated loop form thereby forming spaced curved arms extending forwardly at opposite sides of the vertical shaft and engaging the under side of the vertically slidable member.

ROLLIN C. CALER.

REFERENCES CITED

The following references are of record in the file of this patent:

UNITED STATES PATENTS

| Number | Name | Date |
| --- | --- | --- |
| 2,219,658 | Pasek | Oct. 29, 1940 |